US009356978B2

(12) United States Patent
Chan et al.

(10) Patent No.: US 9,356,978 B2
(45) Date of Patent: May 31, 2016

(54) FEED ROUTING FOR OBJECT BASED COLLABORATION

(71) Applicants: Ho Kei David Chan, Richmond (CA); David Lee, San Francisco, CA (US); Jay Bryant Wakefield, Vancouver (CA); Mark Sullivan, San Francisco, CA (US)

(72) Inventors: Ho Kei David Chan, Richmond (CA); David Lee, San Francisco, CA (US); Jay Bryant Wakefield, Vancouver (CA); Mark Sullivan, San Francisco, CA (US)

(73) Assignee: SAP SE, Walldorf (DE)

( * ) Notice: Subject to any disclaimer, the term of this patent is extended or adjusted under 35 U.S.C. 154(b) by 349 days.

(21) Appl. No.: 14/144,065

(22) Filed: Dec. 30, 2013

(65) Prior Publication Data
US 2015/0134693 A1 May 14, 2015

Related U.S. Application Data

(60) Provisional application No. 61/904,199, filed on Nov. 14, 2013.

(51) Int. Cl.
G06F 17/30 (2006.01)
H04L 29/06 (2006.01)
G06Q 10/10 (2012.01)

(52) U.S. Cl.
CPC ........ H04L 65/403 (2013.01); G06F 17/30424 (2013.01); G06Q 10/101 (2013.01)

(58) Field of Classification Search
None
See application file for complete search history.

(56) References Cited

U.S. PATENT DOCUMENTS

| | | | |
|---|---|---|---|
| 6,289,384 B1 | 9/2001 | Whipple et al. | |
| 7,127,461 B1* | 10/2006 | Zhu | G06F 21/6218 707/694 |
| 7,844,604 B2 | 11/2010 | Baio et al. | |
| 8,171,128 B2 | 5/2012 | Zuckerberg et al. | |
| 8,341,646 B2 | 12/2012 | Bornhoevd et al. | |
| 8,352,562 B2 | 1/2013 | Winkler | |
| 8,775,940 B2 | 7/2014 | Beringer et al. | |
| 8,788,645 B2 | 7/2014 | Beringer et al. | |
| 2004/0243422 A1 | 12/2004 | Weber et al. | |
| 2010/0146243 A1 | 6/2010 | Balko et al. | |
| 2010/0257113 A1 | 10/2010 | Dorrell | |
| 2011/0035323 A1* | 2/2011 | Hamilton | G06Q 10/06 705/301 |
| 2011/0161987 A1 | 6/2011 | Huang et al. | |
| 2011/0213975 A1 | 9/2011 | Sorniotti et al. | |
| 2012/0158843 A1 | 6/2012 | Angani et al. | |
| 2013/0179494 A1 | 7/2013 | Chakravarthy et al. | |
| 2014/0130135 A1 | 5/2014 | Mao et al. | |

OTHER PUBLICATIONS

Hamrick, Introducing SAP Jam: Secure, social collaboration, where you work, Oct. 31, 2012, pp. 1-18.*
Pontefract, A Review of SAP Jam, Oct. 21, 2013, pp. 1-6.*

* cited by examiner

*Primary Examiner* — Albert Phillips, III
(74) *Attorney, Agent, or Firm* — Fountainhead Law Group PC

(57) ABSTRACT

Systems and methods for routing activity information related to objects in an external application to activity feeds associated with users in a collaboration group are disclosed. When activity information is received, it is routed to collaboration group feeds and user feeds based on a set of routing tables. The routing tables associated objects with events, containers, collaboration groups, and finally users. Based on the routing tables, users who belong to a collaboration groups that are associated with a particular object may see the activity information about that object rendered in an activity feed if the external application grants them permission to access the object. Accordingly, security associated with the object in the external application can be maintained when event information about that object is shared in an activity feed in a collaboration system.

18 Claims, 10 Drawing Sheets

FEED ROUTING FOR OBJECT BASED COLLABORATION

CROSS REFERENCE TO RELATED APPLICATIONS

The present application claims priority from U.S. Provisional Patent Application No. 61/904,199, filed on Nov. 14, 2013, which is incorporated herein by reference for all purposes.

BACKGROUND

The present disclosure relates to collaborations systems, and in particular, to routing collaboration feed items in systems that include information from and about objects stored in or maintained by external applications.

Unless otherwise indicated herein, the approaches described in this section are not admitted to be prior art by inclusion in this section.

Collaboration is a practice by which individuals work together to achieve a common goal. In some situations, the goal can be well defined, as is the case in business scenarios in which a group of employees are directed to design, make, sell, and distribute a particular product. In other situations, the goal may be more loosely defined. For instance, the purpose or goal for collaborating may be to increase the social interactions among users to foster an environment of innovation, camaraderie, or creativity.

To facilitate collaboration, various systems with collaborative environments have been developed to provide groups of users with information and mechanisms for collaborating with one another to achieve their collective goals. SAP™ Jam™ is an example of a collaboration system that focuses on collaboration for achieving specific business and sales goals. Systems intended to develop social interaction type collaboration are commonly referred to as "social networks".

The mechanisms for collaboration implemented by such systems vary according to the requirements of the specific type of collaboration and the end goals. In some systems, the interaction among the users may be as simple as exchanging comments in an online forum. For example, various types of chat rooms and discussion boards exist that allow users to post announcements and comments to other member users. The announcements and comments may be organized and posted based on time and/or topic of discussion. Accordingly, a chronological discussion about one subject (e.g., making contact with a particular target customer for a potential sale) may be separated from another chronological discussion about another subject (e.g., finalizing the shipment of products to the target customer in response to a previous purchase). As used herein, the term comment is used generically to refer to any content received from a user in a collaboration system and may include, but is not limited to, alphanumeric text, hyperlinks, files, documents, computer readable code, network addresses, and the like.

The organization of the comments can be in the form of a thread of interactive comments in which users may make comments in response to previously posted comments from other users. Accordingly, the thread of comments is often arranged according to the natural flow of the thread, similar to a real-time conversation. As more comments are posted, the conversation can be updated. However, unlike a real-time conversation, the comments in a particular conversation thread may also be saved or archived, such that users can refer back to prior comments in the thread of comments.

Because not all users of a particular collaboration system will be interested in and/or authorized to view the information in a particular conversation thread, many systems define collaboration groups. Thus, group members who are associated with a particular collaboration group will be able to view and/or participate in the comment thread conducted among the members of that collaboration group. Group-based access control is a simple and efficient manner in which to organize the topics or goals of particular online comment thread. Not only does it provide a mechanism for defining groups of users who are or should be interested in the topic of a particular conversation thread, it also provides a mechanism for controlling access to information in the conversation thread. Members of the groups can share information, some of which may be confidential or otherwise sensitive, freely with other members of the group with some degree of confidence that the viewers of the information have the requisite interest and authorization.

Group-based access control is effective when dealing with information that originates from within the collaboration system. For example, when users log on and post comments or information to a particular collaboration group, they can reasonably assume that the members of a collaboration group are authorized to view the information. However, complications arise when group members, or the collaboration system itself, imports information from external sources. The imported information may have additional authorization or access requirements that some or all the members of a particular collaboration group may not have. Typically, collaboration systems have no mechanisms for verifying group members' authorization levels with respect to information received from an external source. Accordingly, indiscriminately posting information from the external source, like an application external to the collaboration system, may result in information being inadvertently disseminated to users who are not authorized to access the information according the security or authorization requirements of the external system.

SUMMARY

Embodiments of the present disclosure improve collaboration systems. One embodiment of the present disclosure includes a method for routing activity information in a collaboration system that includes operating one or more data processing units to perform the actions of: receiving an activity notification regarding an activity involving an object from an external application separate from the collaboration system, analyzing the activity notification to generate an event item comprising an object identifier associated with the object and a description of the activity involving the object, accessing a first relationship table comprising a plurality of object-container association records to determine one or more container identifiers associated with the object identifier, and creating one or more group feed items in a group feeds table, wherein each group feed item comprises an event item identifier associated with the event item and one of the one or more container identifiers.

In one embodiment, the method includes accessing a collaboration groups table comprising a plurality of container-group association records to determine one or more collaboration group identifiers associated with the one or more container identifiers, accessing a second relationship table comprising a plurality of user-group association records to determine a set of user identifiers associated with the one or more collaboration group identifiers, querying the external application to determine which of the set of user identifiers are authorized to access the object, receiving a response from the external application comprising a set of authorized user identifiers, and generating an intersection of the set of user identifiers and the set of authorized user identifiers to generate a set of common user identifiers.

In one embodiment, the method includes creating a plurality of user feed items in a user feeds table, wherein each of the plurality of user feed items comprises one user identifier from the set of common user identifiers associated with the event item identifier, and rendering the plurality of user feed items in a plurality of corresponding user feeds associated with individual users according to the set of common user identifiers.

In one embodiment, the method includes rendering the plurality of group feed items as posts in a plurality of corresponding group feeds according to the one or more container identifiers and the plurality of container-group association records, receiving a comment associated with one of the plurality of object-container association records through one of the plurality of corresponding group feeds from a user of the collaboration system, analyzing the comment to generate a comment event item comprising a comment identifier and the one of the plurality of object-container association records, creating a group feed comment item in the group feeds table comprising the container identifier from the one of the plurality of object-container association records and a comment event item identifier associated with the comment event item, accessing a collaboration groups table comprising a plurality of container-group association records to determine a collaboration group identifier associated with the container identifier, accessing a second relationship table comprising a plurality of user-group association records to determine a set of user identifiers associated with the one or more collaboration group identifiers, querying the external application to determine which of the set of user identifiers are authorized to access the object, receiving a response from the external application comprising a set of authorized user identifiers, and generating an intersection of the set of user identifiers and the set of authorized user identifiers to generate a set of common user identifiers.

In one embodiment, the method includes rendering the group feed comment item as a comment post in collaboration group feeds associated with user identifiers in the set of common user identifiers.

In one embodiment, the object comprises a business object that represents a business record.

Another embodiment includes a non-transitory computer readable medium comprising instructions that when executed by a computer processor cause the computer processor to be configured for routing activity information in a collaboration system by performing the actions of: receiving an activity notification regarding an activity involving an object from an external application separate from the collaboration system; analyzing the activity notification to generate an event item comprising an object identifier associated with the object and a description of the activity involving the object; accessing a first relationship table comprising a plurality of object-container association records to determine one or more container identifiers associated with the object identifier; and creating one or more group feed items in a group feeds table, wherein each group feed item comprises an event item identifier associated with the event item and one of the one or more container identifiers.

Yet another embodiment includes a collaboration system comprising: a processor; and a non-transitory computer readable medium comprising instructions that when executed by the processor cause the processor to be configured to: receive an activity notification regarding an activity involving an object from an external application separate from the collaboration system; analyze the activity notification to generate an event item comprising an object identifier associated with the object and a description of the activity involving the object; access a first relationship table comprising a plurality of object-container association records to determine one or more container identifiers associated with the object identifier; and create one or more group feed items in a group feeds table, wherein each group feed item comprise an event item identifier associated with the event item and one of the one or more container identifiers.

The following detailed description and accompanying drawings provide a better understanding of the nature and advantages of the present invention.

DETAILED DESCRIPTION

Figure 1:
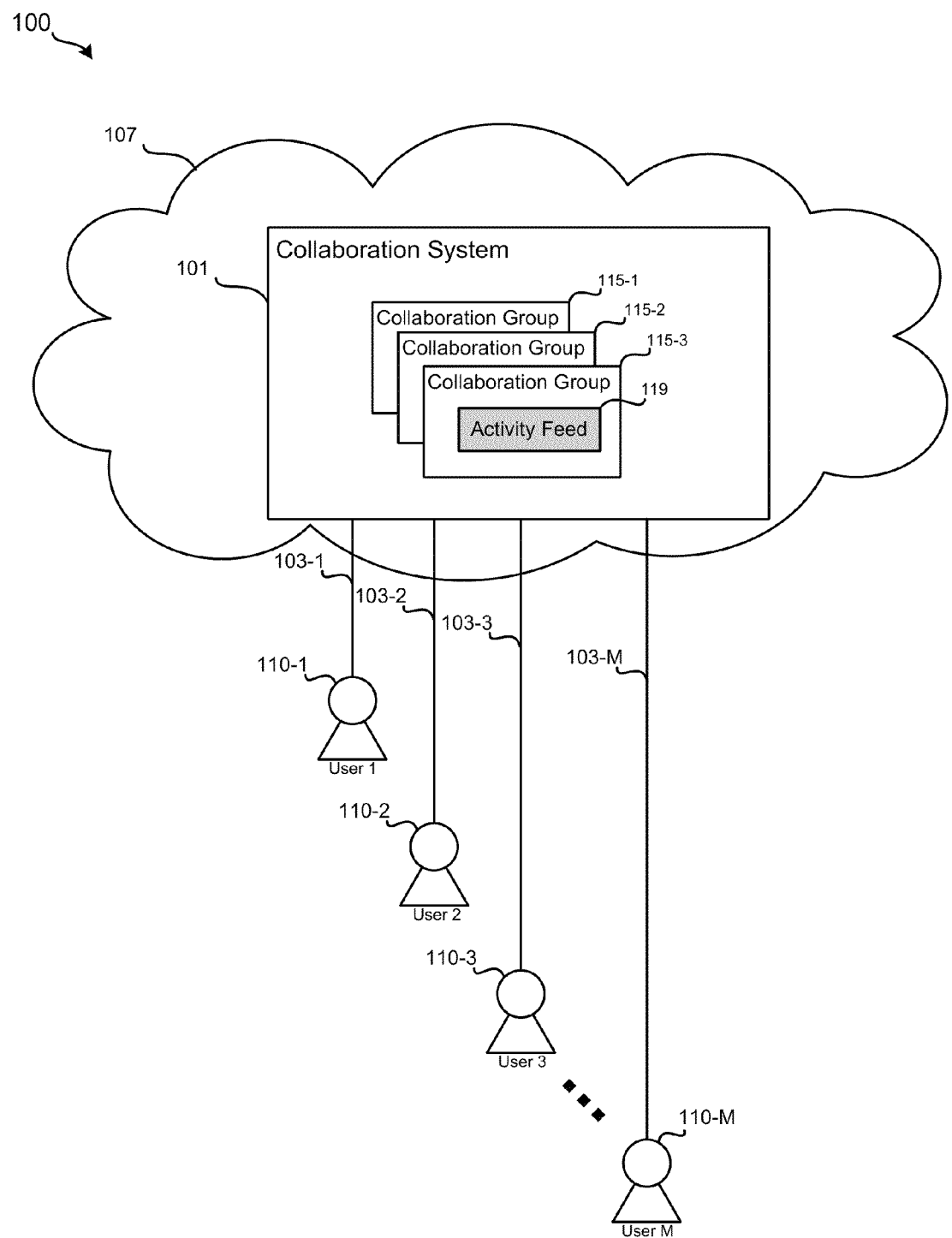
FIG. 1 illustrates a collaboration system according to an embodiment of the present disclosure.

Described herein are improved techniques and systems for connecting collaboration systems with external applications. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Overview and Definitions

Various embodiments of the present disclosure provide techniques for improved integration of information provided by external applications (e.g., a customer relationship management (CRM) application) about activity in those applications into a collaboration system. As used herein, applications, such as CRM and other business applications, are referred to as "external applications" for simplicity and clarity. The term "collaboration system" refers to any application or system with mechanisms for providing information to individual and groups of users about internal and external events or activity. For example, a collaboration system may include a number of activity feeds that support the dissemination of information about changes to objects in an external application, or comments from users about those changes, to one or more individual users or groups of users.

External application may refer to any application or system that can exchange data with a collaboration system. Accordingly, the external application may include a separate application executed on one or more separate computing system or on the same computing system on which the collaboration system is executed. However, embodiments of the present disclosure also advantageously provide techniques for easily integrating the collaboration system into an existing external application. For example, using various embodiments of the present disclosure, mechanisms for collaboration among various groups of users can be added to another application, such as a CRM or other business application. In such embodiments, it is possible for the collaboration system to be included in an external application as a module that receives activity information from one or more other modules in the external application.

Collaboration systems for sharing information may grant users access to certain information based on simple user-specific permissions and membership in particular groups. In such systems, various users have access to streams of information and comments, referred to herein as "feeds", based on their affiliation with specific groups defined by certain users of the system. For example, a sales manager can set up a specific group of sales people and other support staff who are responsible for servicing a particular customer. Members of a group will be predetermined and specifically listed by name or other identifier in a group record, such as a collaboration group member table. Any member of a particular collaboration group may be granted permission to see, contribute to, or comment on information displayed in the corresponding collaboration group feed.

According to various embodiments of the present disclosure, collaboration group membership based access to information about activity involving objects in an external application can be combined with the permissions granted to specific users regarding those objects in the external application. In such embodiments, a user's ability to see a particular activity feed item involving a specific object in an external application, in either a user-specific activity feed or in a collaboration group feed, can be based on that user's membership in a particular collaboration group and the permissions granted by the external application to that user relative to that specific object. When viewed from the perspective of granting multiple users access to a specific activity feed item associated with a particular object in a collaboration group feed, the users who will granted permission may be represented by the intersection of the users who are members of the collaboration group and the users who have permission to access the object in the external application. Such embodiments advantageously provide for control of permissions for users to view certain collaboration group feed items from within the collaboration system or the external object.

Collaboration Groups and Collaboration Group Feeds

A collaboration group can be defined by a particular goal or by the member users listed as members or followers of the collaboration group. Such collaboration groups may be associated with or include one or more activity feeds. An activity feed can include information (e.g., comments or posts) from members of the group, as well as information about activity involving objects, records, or data in the collaboration system or in an external application that may be pertinent to the corresponding goal of the collaboration group. As such, a collaboration group can be created for any purpose. For instance, a collaboration group may directed toward the task of servicing a particular customer (i.e., customer specific collaboration group) or closing a deal based on a particular sales opportunity with that customer (i.e., sales opportunity specific collaboration group).

Member users of such collaboration groups can be defined by having specific users follow or subscribe to the group. Some subset of the users of the collaboration system may follow the customer specific collaboration group, and some other subset of user may follow the sales opportunity specific collaboration group. Which users follow which groups may be recorded in entries in a relationship table referred to herein as a follows table.

While it is possible that two subsets of users may be identical, it is also possible that, for whatever reason, some or all of the users in one subset of users may not be included in another subset of users. For instance, some of the users in the customer specific collaboration group may include tech support or administrative personnel who may not be needed in or authorized to view the information disseminated in the sales opportunity specific collaboration group. For example, the sales opportunity specific collaboration group may consist of sales people, members of the logistics team, and executives who are essential to close the deal and users who otherwise have need or authorization to view the information shared among the users of the sales opportunity specific collaboration group.

To share information with users in a collaboration group, an activity feed may be associated with the collaboration group and defined to include information relevant to the goal of the collaboration group. In reference to the sales opportunity specific collaboration group, an associated activity feed may include information about activity involving an object that represents the particular sales opportunity. Accordingly, any information about specific events involving the sales opportunity object can be pushed to the associated activity feed as activity feed items. The member users who follow the group may then be allowed to see the activity feed items in the activity feed associated with the collaboration group or in their own personal user feeds. Activity feeds that are associated with a collaboration group are sometimes referred to herein as collaboration group feeds. Activity feeds that are associated with particular users are sometimes referred to herein as user feeds.

In some scenarios, it is possible that users who follow a particular collaboration group may not be authorized to access the sales opportunity object by the external application that maintains or services the object. To avoid exposing sensitive or restricted object specific information to users in collaboration groups who are not authorized to access particular objects associated with the group requires careful consideration when designating which users are allowed to follow which groups. Creating the appropriate entries in the follows table would require checking each user's authorization to access object specific information that may currently or potentially be shared in the collaboration group feed before they would be allowed to follow the corresponding collaboration group. Combing through all of the possible user and object combinations for a particular group is not only labor intensive and prone to error, it also reduces the flexibility of a collaboration to change goals or incorporate information from new or unforeseen external objects. To avoid potentially exposing sensitive information about a newly incorporated object to unauthorized member users of the collaboration group, the authorization of each existing member to access the new object would need to be confirmed. For any users that are not authorized to view information about the new object, the corresponding entries in the follows table would need to be altered or deleted, thus removing the unauthorized user from the collaboration group. Removing a user from a collaboration group who is unauthorized to view information about a particular object may be undesirable if that user may be needed for collaborating on other information shared in the corresponding collaboration group feed. This is particularly true in situations where the new objects are only incidentally or infrequently referred to in the collaboration group feed.

Objects and Business Objects

For the sake of clarity, the terms "objects" and "business objects" can be used interchangeably in the description of various embodiments of the present disclosure. While the term "object" can be used in reference to generic software solutions, the term business object is used in specific scenarios concerning business management software solutions. In business management software solutions, the term "business object" is used to refer to programming objects used in programming the software that relates to a particular thing in a real world business context. A business object, for example, may be used to contain information relating to a customer account. Whereas a computer program may implement classes (which typically result in programming objects, such as business objects, managing or executing behaviors), a business object usually does nothing itself but instead holds a set of instance variables or properties (also known as attributes) and associations with other business objects, weaving a map of objects representing the business relationships. The "attributes" may define features of the thing which the business object is related to. The "associations" may define a business object's relationship to other business objects.

In general, a business object is a code construct (e.g., a data structure) that corresponds directly to a thing in the actual business, and the actual business uses software (e.g., a computer program) to manipulate the business object as real-world activities take place that are related to the thing. For example, when a sales order is fulfilled, the business object may be altered to represent data reflecting that real world event.

The business object encapsulates the business logic related to the thing, and encapsulates the data that is required by the logic and also describes, defines, makes up, is contained by, or is associated with the thing. In general, the "thing" is recognizable to a non-technical person familiar with the business, like the users, business analysts, etc. Each object has data that describes or is attributed to the object and methods that make decisions based on that data. For example, a customer account BO may have a customer name attribute and market capitalization attribute (data), and may also have related methods such as create, modify and read for performing actions relating to the BO. Things may be tangible objects with real-world meanings, or may be conceptual objects that relate to the business and its business processes.

As noted above, the general term "business object" may be more precisely stated by using two other terms: business object instance and business object class. A business object instance refers to a specific business object, often including specific data that is processed by the data processing system; whereas a business object class refers to a general class of business object which may itself serve as a template for business object instances. Example business object classes include a purchase order, a sales order, etc.; corresponding instances include a specific purchase order with specific data, a specific sales order with specific data, etc. Embodiments use both business object classes as well as business object instances; often the general term "business object" may be used to describe both since the more precise term is clear from the context.

Collaboration Systems

FIG. 1 illustrates a system 100 that includes a particular example of a network topology that allows various users 110 to access the collaboration system 101. As shown, the collaboration system 101 may be implemented in a particular network 107. When implemented in a network 107, such as a cloud computing environment, the collaboration system 101 may be implemented in one or more computing device (e.g., server computers). In such embodiments, each of the M users, where M is a natural number, may connect to the collaboration system 101 over an electronic communication connection 103 using a computing device, such as a client computer. For the sake of clarity, the client computing devices are not shown. However, one of ordinary skill in the art will recognize that the users 110 may use a client computing device executing a corresponding client application or general purpose network or web browsers executing a web-based thin client application to connect to the collaboration system 101. Web-based thin client applications may be implemented in various languages, such as Java, HTML, HTML5, and the like.

The collaboration system 101 may include mechanisms for receiving information from multiple users 110 using corresponding client computing devices. The information received from the users 110 may include any type of electronic data including, but not limited to, text comments, files, hyperlinks, or network addresses to particular objects or data. To organize information received from the user's 110, the collaboration system 101 may create a one or more collaboration groups 115.

In some embodiments, collaboration groups 115 provide the main mechanism by which users 110 may share information with other users of the collaboration system 101. The collaboration groups 115 can be defined by various attributes. In some embodiments, the attributes of the collaboration groups 115 include a listing of the member users who may access the information shared in the collaboration group 115 and or a listing of the member users who may post information to the collaboration group 115. Accordingly, some of the users associated with a particular collaboration group 115 may be authorized to add or edit information (e.g., start conversation threads, post comments to the conversation threads, etc.), while some of the users associated with the particular collaboration group 115 may be limited in how they may participate in a particular collaboration group 115. For example, some of the users associated with the collaboration group 115 may only be authorized to view the information posted by other member users of the collaboration group 115. Accordingly, in various embodiments of the present disclosure, different member users 110 of a collaboration group 115 may be organized into or associated with different levels of group membership that define what actions they may take, or how they may otherwise participate, within the collaboration group 115.

Each collaboration group 115 may include an activity feed 119. In various embodiments, the activity feed 119 is the mechanism by which information is shared among the member users of a particular collaboration group 115. In some embodiments, the activity feed 119 may include an organized listing of comments posted by various users 110. Some activity feeds 119 may be organized chronologically. For example, the most recently added information may be listed at the top of a list, while previously added information may be pushed farther down the list as new information is added.

In addition, the activity feed 119 may also include indications of topical references. For example, as member users post comments, other users may respond to those comments. Comments directed towards similar topics can be grouped chronologically relative to the other related comments. Other specific details of activity feeds 119 of specific collaboration groups 115 will be discussed in more detail herein in reference to other figures and specific examples.

Figure 2:
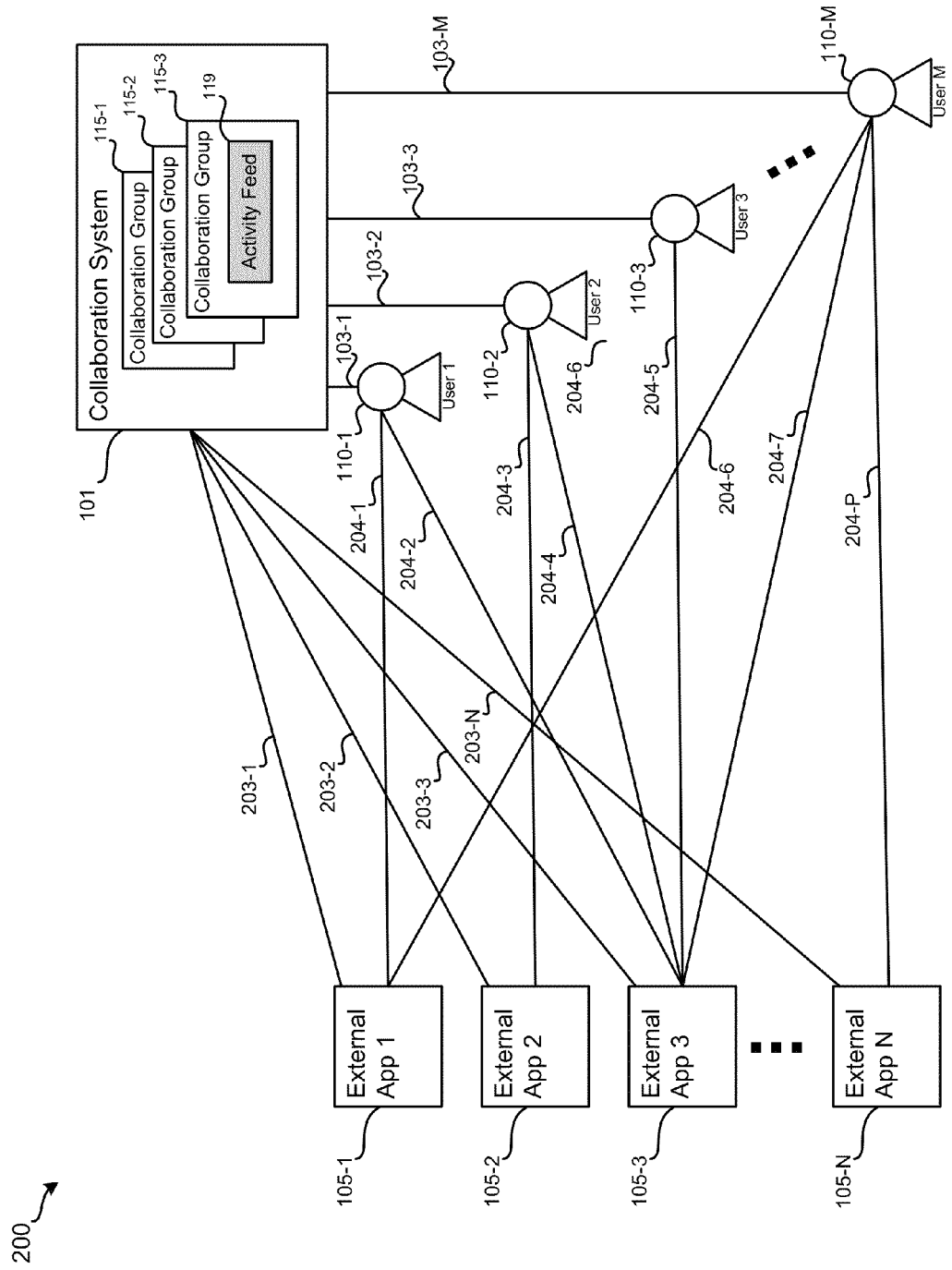
FIG. 2 illustrates a collaboration system connected to external applications according to an embodiment of the present disclosure.

In addition to providing a mechanism by which users 110 can directly share information with one or more other member users of a particular collaboration group 115, the collaboration system 101 may also include information received regarding activity in various external applications 105. FIG. 2 illustrates a system 200, according to various embodiments, that includes a network topology for connecting users 110, external applications 105, and collaboration system 101 over various networks connections 203, 204, and 103.

In such embodiments, the collaboration system 101 may include corresponding connections 203 with N external applications 105, where N is a natural number. The connections 203 may include various types of electronic communication media and protocols. Similarly, the client computing devices used by the user 110 to communicate with the collaboration system 101 may also be used to connect to and interact with one or more of the external applications 105 over corresponding connections 204. In the specific example shown, user 110-1 is authorized to connect to and use external applications 105-1 and 105-3 using connections 204-1 and 204-2. User 110-2 is authorized to connect to and use external applications 105-2 and 105-3 over connections 204-3 and 204-4. Similarly, user 110-3 is authorized to connect to and use external application 105-3 over connections 204-5, and user 110-M is authorized to connect to and use external applications 105-1, 105-3, and 105-N over connections 204-5, 204-6, and 204-P.

As the external applications 105 perform their various internal functions and activities, the external applications 105 may push information about the activities to the collaboration system 101 over connections 203. The information in one or more the external applications 105 may include information about activity involving a particular object instantiated in or maintained by those external applications 105. In addition, information about activity involving particular objects in one or more of the external applications 105 may include information about which one or more of the users 110 initiated or completed the activity. For example, the information may include data that indicates that user 110-2 changed one or more attributes of an object in the external application 105-3.

When the collaboration system 101 receives information from an external application 105, it can create a corresponding event item that includes some or all of the information in an event table. The collaboration system may then route the event to one or more previously or dynamically determined collaboration groups 115 so that the information can be included in a corresponding activity feed 119.

In some embodiments, when information from an external application 105 is received, the collaboration system 101 may determine to distribute the information in the activity feed of a particular collaboration group 115 or to one or more users based on their authorization access level to the corresponding collaboration group 115 and/or the external application 105. In such embodiments, information received from external application 105 may or may not be available to some or all of the member users of a particular collaboration group 115 due to limitations imposed by the external application. The limitations imposed by the external application may include restrictions that define which member users 110 have access to that particular information in the external application or in a particular external object. Accordingly, for a particular user 110 to be able to view information received from a particular external application 105 about a particular object in activity feed 119 of a collaboration group 115 to which that user 110 belongs, that user 110 must also have permission to view that information based on permissions granted by the external application 105.

Such embodiments advantageously provide a layer of security that prevents information from an external application 105 from being distributed to member users of a collaboration group 115 who would otherwise not have access to the information or the external application 105 independently. As previously stated, embodiments of the present disclosure advantageously allow for the integration of information from external applications 105 into an existing collaboration system 101 collaboration groups 115 without compromising the security of the external applications 105.

Figure 3:
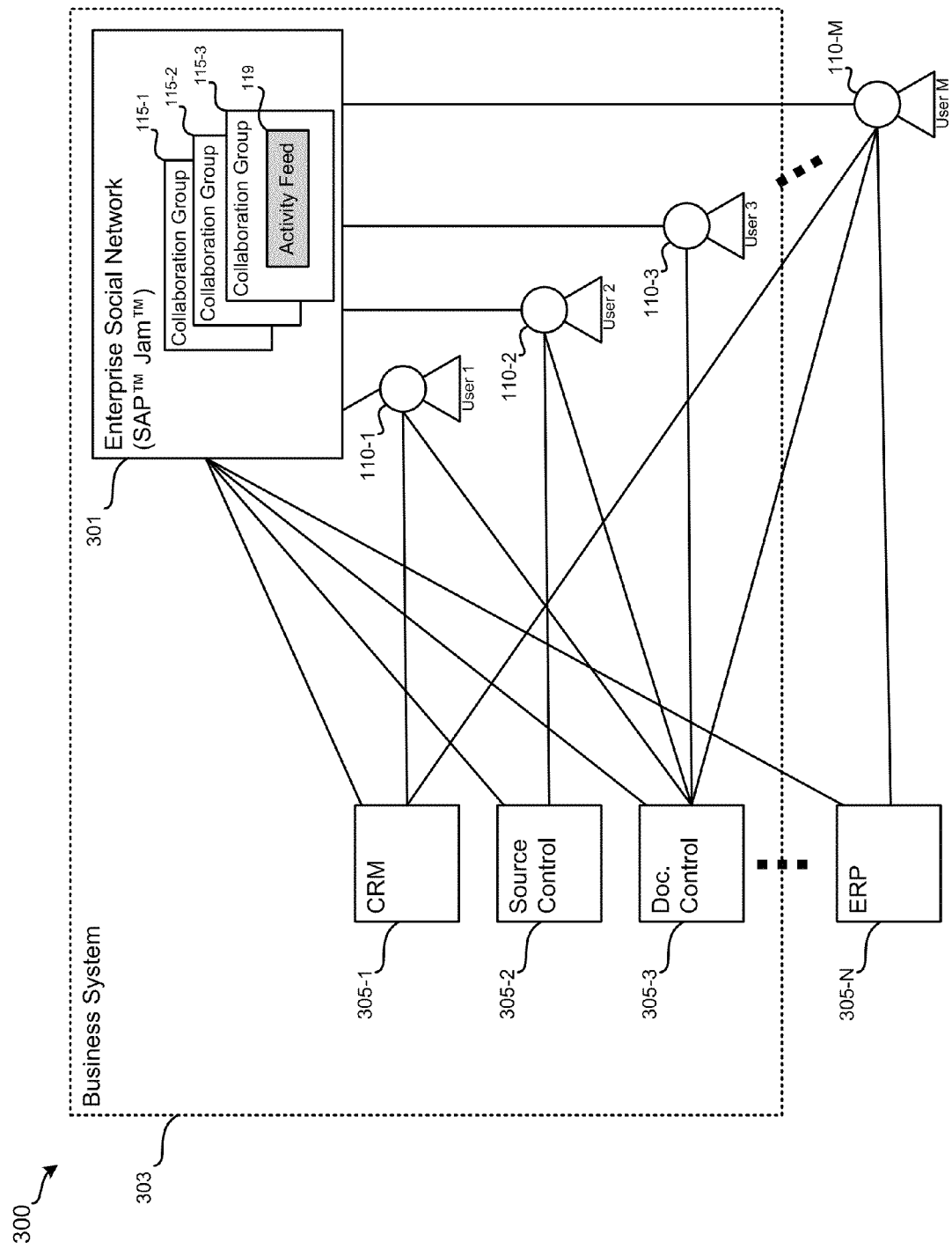
FIG. 3 illustrates a particular example collaboration system connected to example external applications, according to an embodiment of the present disclosure.

To illustrate this advantage, FIG. 3 depicts a specific example system 300 in which a collaboration system is implemented as an enterprise social network 301 (e.g., SAP™ Jam™) in a business system 303 that includes example external applications 305, customer relationship management (CRM) application 305-1, a source control application 305-2, and a document control application 305-3. The system 303 or the enterprise social network 301 may also be connected to an enterprise resource planning (ERP) application 305-N implemented in an external system (e.g., in a separate cloud computing environment).

CRM 305-1 may not include its own collaboration system or module. However, information about activity handled or performed by the CRM 305-1 may be pushed to the enterprise social network 301. The information pushed to the enterprise social networking 301 by the CRM 305-1 may include information about activity involving a particular business object resident in the CRM 305-1.

For instance, the CRM 305-1 may include a number of opportunity business objects that represent corresponding sales opportunities to particular target customers. In one specific example, user 110-M may be a sales team manager who creates a sales opportunity business object in CRM 305-1 that represents a potential sale of a particular product to a particular customer. When the sales manager creates the sales opportunity business object (i.e., requests the CRM to create an instance of a sales opportunity class), he may define various attributes, such as the customer name, the members of the sales team, the dollar value of the potential revenue, and the like. Accordingly, members of the sales team, and any other users that the sales manager explicitly grants permission, will be considered authorized users with respect to the sales opportunity business object in the CRM 305-1.

In some embodiments, all authorized users of the particular business object will be authorized with full access and editing permissions. However, in other embodiments, the authorized users of the particular business object may be assigned differing levels of access and editing permissions. For example, the sales team manager who created the sales opportunity business object may have full and unrestricted permission to change, edit, or delete the sales opportunity business object, while other authorized users may only be able to view or make limited changes according to their authorization level.

The status of a particular user as an authorized user, and/or his respective authorization level, in the CRM 305-1 may be referenced by various embodiments of the present disclosure to determine whether an event involving the relevant business object will be routed to an activity feed viewable by the user.

In yet other embodiments, the listing of a particular user as an authorized user of a particular business object may be referenced by various embodiments of the present disclosure to determine whether an activity feed item representing a previously routed event will be shown to the particular user. Accordingly, the determination that a particular user is an authorized user of a particular object may be used to determine what event information is routed to that user's individual user feed and/or which activity feed items will be shown to that user in a group feed that the user follows.

Embodiments of the present disclosure address two aspects of routing events to activity feeds viewable by various users. The one phase involves routing events received from an external application or comments received from other users of a particular collaboration system to one or more activity feeds associated with a collaboration group or a particular user. Another phase involves verifying the continued authorization of a particular user to view activity feed items previously routed to activity feeds associated with a collaboration group or a particular user.

Figure 4:
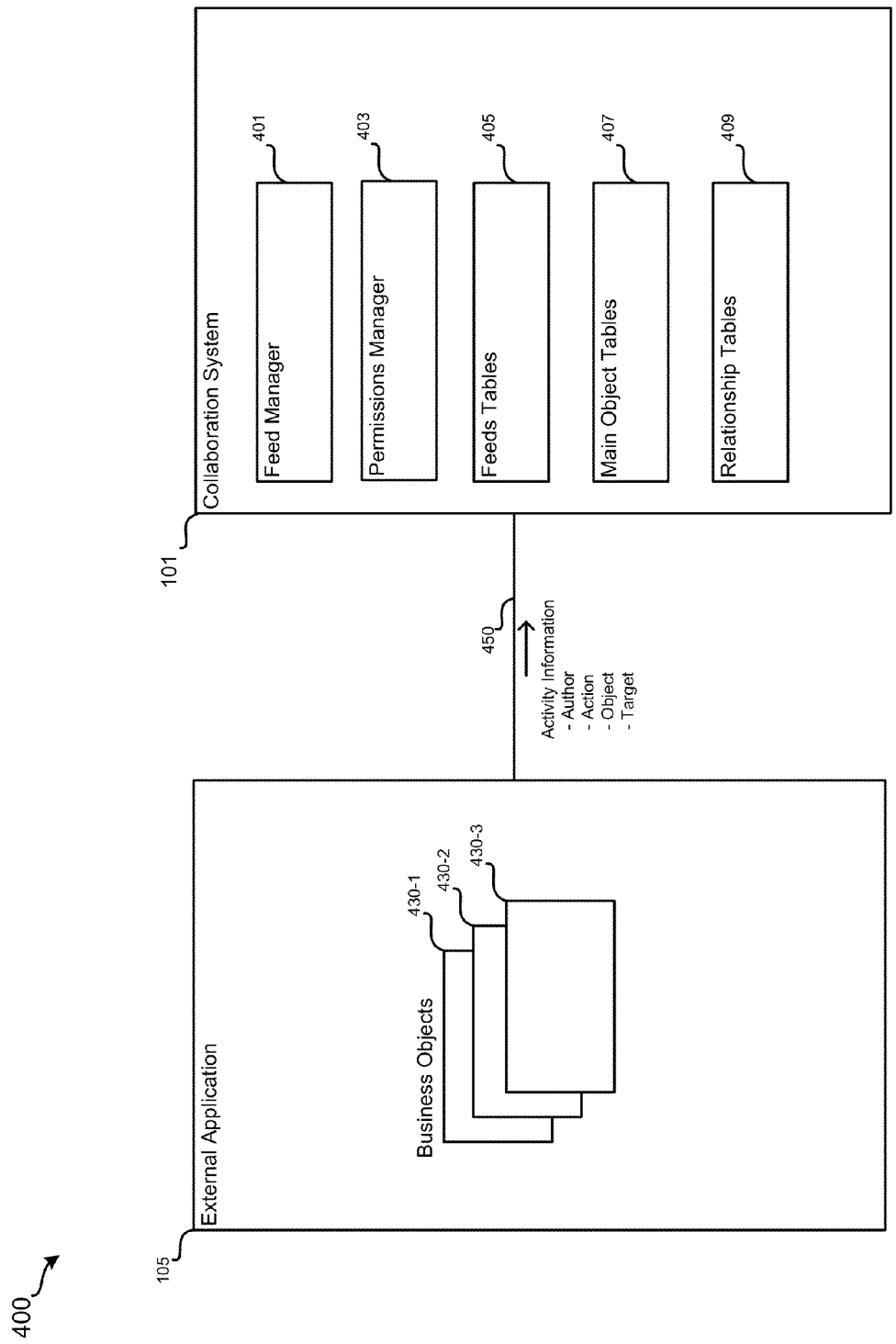
FIG. 4 illustrates a schematic of the components of a collaboration system and an external application according to an embodiment of the present disclosure.

FIG. 4 illustrates a schematic of a system 400 for routing activity information from an external application 105 to one or more activity feeds in a collaboration system 101 over a data or network connection 450. Because the external application 105 and the collaboration system 101 may be implemented in the same or in separate computing systems, connection 450 may include various types of electronic communication media and protocols. In one embodiment, connection 450 can include a network connection over one or more networks, such as the Internet. In another embodiment, connection 450 can include an application programming interface (API) exchanging data between external application 105 and the collaboration system 101.

As shown, the external application 105 may send activity information to the collaboration system 101. In one embodiment, the external application 105 may push the activity information any time an event occurs involving one or more of the business objects 430. Activity that may that trigger the external application 105 to send activity information to the collaboration system 101 may include any change, such as editing, deleting, and the like, to one or more of the business objects 430. For example, a user 110 may access the external application 105 to perform an operation (e.g., create, change, edit, etc.) on one of the business objects 430. As used herein, any action or operation performed by a user 110 or the external application 105 on one or more of the business objects 430 is considered an event. When the external application 105 detects an event it may send activity information about the event to the collaboration system.

In some embodiments, the activity information can include basic information about the who, what, when, where, and why a particular business object 430 was altered. Accordingly, the activity information can include the name or identifier of a user who initiated the event activity, a name or identifier of the relevant business object, a description of the action or operation (e.g., which attribute of the object was changed and how it was changed), and a timestamp associated with the event activity, and a description or code designating why the activity was carried out (e.g., the original information was incorrect or new information was discovered). In addition to the specifics about the event, the activity information may also include an indication of one or more target activity feeds to which the event should be routed. For example, the activity information may include designation that one or more particular collaboration groups should create a feed item that represents the event.

Once the collaboration system 101 receives the activity information, the feed manager 401 and the permissions manager 403 can refer to various routing tables, such as feeds tables 405, main object tables 407 and relationship tables 409 to route the activity information to one or more activity feeds. The groupings or the various routings tables into feeds tables 405, main object tables 407 and relationship tables 409 is only one example. In various embodiments of the present disclosure, the feed manager 401 and/or the permission manager 403 may be implemented as combinations of software, firmware, and hardware. Accordingly, the functionality of the manager 401 and permissions manager 403 may be implemented in a single module or as separate modules (as shown). In either implementation, the feed manager 401 or the permissions manager 403 can access a collaboration system data store (not shown) containing the feeds tables 405, the main object tables 407, and the relationship tables 409 to determine to which activity feeds the activity information should be routed.

Routing Tables

Figure 5:
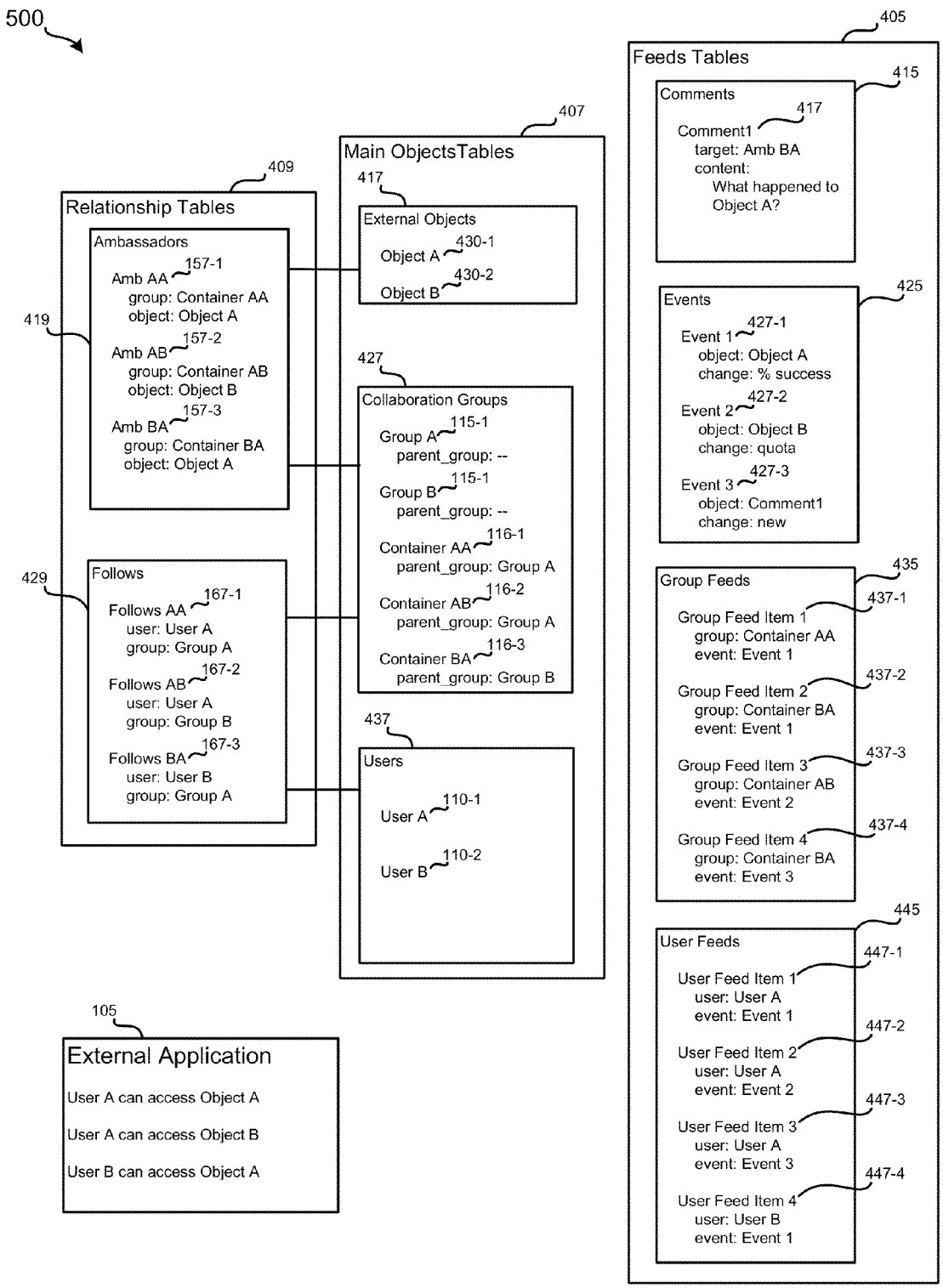
FIG. 5 illustrates an example configuration of routing tables according to an embodiment of the present disclosure.

FIG. 5 illustrates one example implementation of routing tables 500 that may be used by the feed manager 401 and the permissions manager 403 for routing activity information and comments to one or more activity feeds, according to an embodiment of the present disclosure. As shown, the routing tables 500 include feeds tables 405, main object tables 407, and relationship tables 409. To illustrate how the feed manager 401 and the permission manager 403 route activity information, the various routing tables 500 of FIG. 5 are shown populated with a particular example routing configuration.

In one embodiment, feeds tables 405 includes a comments table 415, an events table 425, a group feeds table 435, and a user feeds table 445. Comments table 415 is a table for receiving, organizing, and storing comments posted by users 110 of the collaboration system 101. Events table 425 is a table for receiving, organizing, and storing activity information about events that occur in one or more external applications 105 involving one or more business objects and events that include comments. Group feeds table 435 is a table for organizing and storing events to be routed to one or more collaboration groups as collaboration group feed items. Finally, the feeds tables 405 may also include user feeds table 445 for organizing and storing events to be routed to one or more individual user feeds as user feed items.

The main object tables 407 may include an external object table 417, collaboration groups table 427, and a users table 437. In various embodiments, the external object table 417 includes a listing of names and/or identifiers of objects 430 about which activity information can be routed. The collaboration groups table 427 may include records of multiple collaboration group names or identifiers 115 and names or identifiers of containers 116. In some embodiments, these records are referred to as container-group association records. The users table 437 may include the names or user identifiers for the users 110 authorized to access the collaboration system 101.

As used herein, the term "container" refers to any data structure that contains the feed items related to a business object to be displayed within a collaboration group. The feed items in a particular container may be either hidden from or displayed to a particular user depending on the permissions described by an external application.

Relationship tables 409 may include an ambassadors table 419 and a follows table 429. In some embodiments, the ambassadors table 419 may include a number of ambassador relationships 157 records that associate particular collaboration groups 115 or containers 116 with particular objects 430.

In some embodiments the ambassador relationships 157 records are referred to as object-container records. The follows table 429 may include associations between users 110 and collaboration groups 115 or containers 116.

As shown, follows table 429 defines a number of associations 167 between users and collaboration groups. In some embodiments, these associations of are referred to as user-group association records. The associations in the follows tables 429 define which users "follow" the activity feeds in various collaboration groups 115.

In the particular example shown, the routing tables 500 include a number of entries that define a particular set of routing rules for routing activity information to various activity feeds for a user A and a user B regarding activity in object A and object B. The example shown in FIG. 5 includes a number of premises. For instance, one premise is that the permissions in external application 105 specify that user A may access object A and object B, but user B can only access object A. Another premise of the configuration shown in FIG. 5 is that both collaboration group A and collaboration group B track events involving object A. However, only collaboration group A tracks events involving object B. This is reflected in the comparison of the ambassadors 157 records in ambassadors table 419 with the records in the collaborations groups table 427.

When the collaboration system 101 receives or observes activity information regarding object A or object B, it creates a corresponding event in the events table 425 as an event or event record 427. Each event 427 includes an object identifier and one or more other attributes. In some embodiments, the attribute includes a description of a change to the associated object. In the specific example shown, event 427-1 indicates that a percentage of success in object A changed. Event 427-2 indicates that the quota for object B was changed. In addition, events table 425 shows that Event 3 427-3 shows that comment 1 was newly created.

When an event 427 is logged in the events table 425, the feed manager, or some other component of the collaboration system 101 identifies the object identifier. The feed manager, based on the object identifier for a particular event, can reference the ambassadors table 419 to retrieve an ambassador record 157 and, consequently, a group or container associated with the object identifier. In the particular example shown, event 427-1 indicates that a change to object A 430-1 has occurred. According to the ambassadors table 419, object A is associated with container AA and container BA in the ambassador entries 157-1 and 157-3. In this way, any event 427 created that involves object A can be included in the corresponding containers defined in the records of ambassadors table 419.

Once the containers are identified, the feed manager 401 can create corresponding group feed items 437 in the group feeds tables 435. Each group feed item 437 can include an association between a particular event 427 and the container associated with the object 430 for that event by the ambassadors 157 in ambassadors table 419. Based on the information in the group feed items 437, the feed manager 401 can access collaboration groups table 427 to determine one or more parent groups associated with the containers in each group feed item 437. Each group feed item 437 includes an association between a particular container and a particular event 427. In the particular example shown in FIG. 5, group feed items 437-1 and 437-2 associate event 1 427-1 with container AA and container BA. Based on the collaboration groups table 427, the feed manager 401 can determine that event 1 should be routed to collaboration group A and collaboration group B according to container entries 116-1 and 116-3.

The next step is to determine which users 110 follow which collaboration groups 115. In some embodiments, this can be considered determining which users belong to which collaboration groups. In various embodiments of the present disclosure, each group feed item 437 can be routed to a collaboration group 115 based on the collaboration groups table 427. Next, referencing the follows table 429, individual users 110 can be identified who follow each of the collaboration groups 115. In the example shown, follows table 429 indicates that user A 110-1 follows collaboration group A 115-1 as indicated in follows entry AA 167-1, user A 110-1 also follows collaboration group B 115-2 as indicated in follows entry AB 167-2, and user B 110-2 follows collaboration group A 115-1 as indicated in follows entry BA 167-3.

Once the individual users 110 who follow the relevant groups 115 are identified, the feed manager 401 or the permissions manager 403 can query the external application 105 to ask which of the identified users have access to the related object 430. In this example, since we are concerned with object A 430-1 and object B 430-2, the feed manager 401 or the permission manager 403 can query the external application to determine whether user A 110-1 is authorized to access object A 430-1, and what that level of authorization may be.

If the external application 105 responds that user A 110-1 does have access to object A 430-1, then the feed manager 401 may create a corresponding user feed item 447 in the user feeds table 445 that associates a user identifier for the user with a particular event. In this way, embodiments of the present disclosure determine whether a particular event should be shown in a particular user feed based on determination of users who are authorized to view a particular event as defined by the routing tables 500 and the permissions granted to users to access particular objects by the external application 105.

Feed Item Routing

Figure 6:
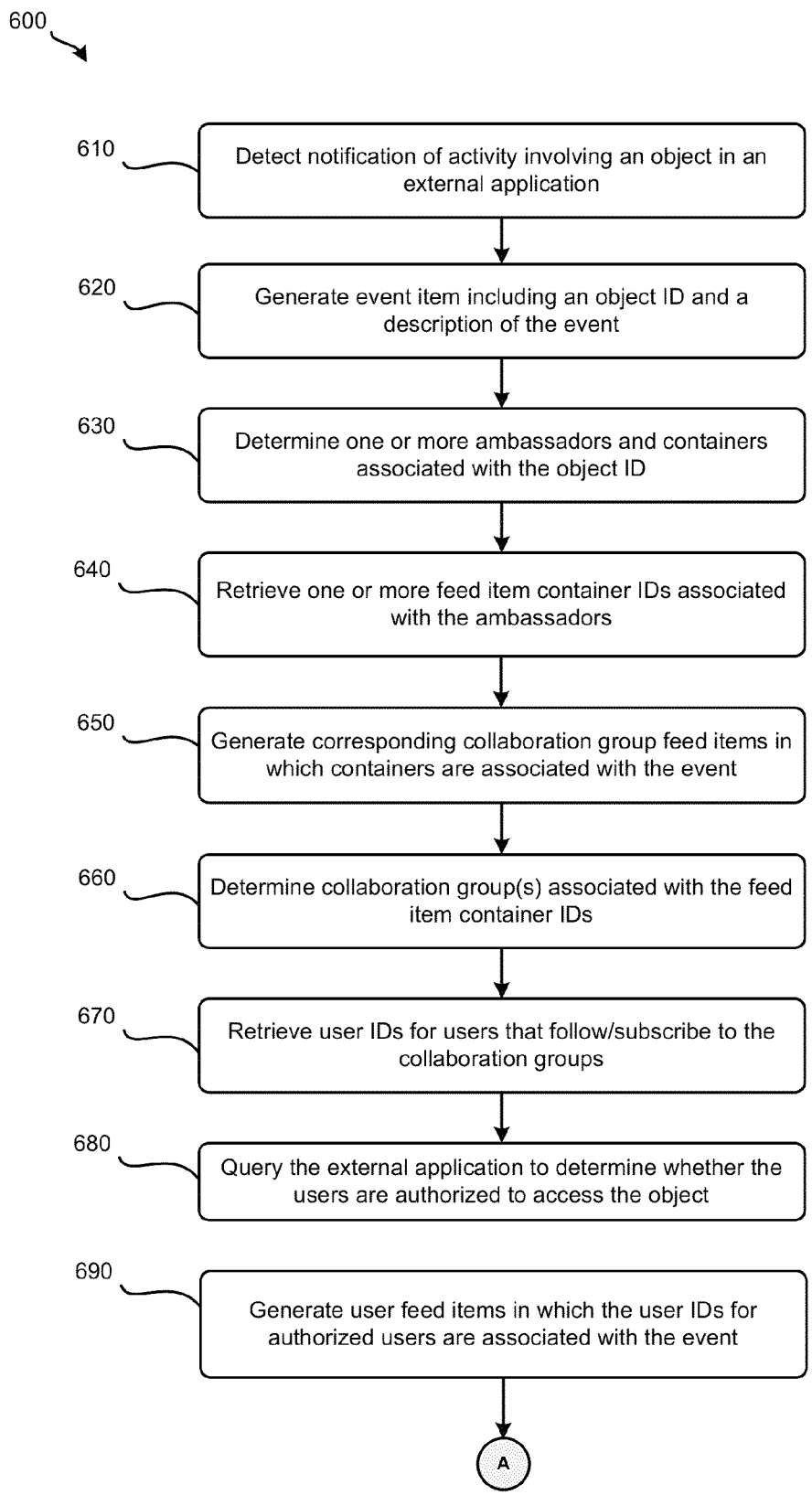
FIG. 6 is a flowchart of a method for routing feed items according to an embodiment of the present disclosure.

FIG. 6 is a flowchart of a method 600 for routing activity information to specific user feeds and collaboration group feeds, according to various embodiments of the present disclosure. Method 600 begins at action 610 in which the collaboration system 101 detects or receives an activity notification of an activity involving an object 430 in an external application 105. In some embodiments, the external application 105 sends and the collaboration system 101 receives an activity notification that includes activity information. The activity information may include an object identifier and a description of activity involving the corresponding object 430.

In action 620, the collaboration system 101 can generate an event item 427 that includes an object identifier associated with the object 430 in the external application 105 and a description of the activity by analyzing the activity notification. In action 630, the collaboration system 101 can determine one or more ambassadors 157 associated with the object identifier based on one or more routing tables 500. In one embodiment, the collaboration system 101 may access the ambassadors table 419 to determine ambassadors 157 associated with the object. The ambassadors 157 may define an association between the object identifier and one or more containers. As used herein an ambassador provides a link at least among an event item 427, one or more collaborations groups 427, and one or more users 437 through the various routing tables 500.

In action 640, the collaboration system 101 can retrieve one or more container identifiers associated with the ambassadors 157 by accessing the ambassadors table 419. The collaboration system 101 may then generate a corresponding collaboration group feed item or items 437 that associate the containers defined by the ambassadors 157 with the observed event, in action 650. The collaboration group feed items 437 can be stored in a group feeds table 435. The association between the containers and the observed event can be stored in the collaboration group feed items corresponding container identifiers associated with event identifiers.

In action 660, the collaboration system 101 can access a collaboration groups table 427 to determine collaboration groups associated with the container containers or container identifiers. In some embodiments, the relationship between a collaboration group 115 and a container 116 can be referred to a child-parent relationship. For example, a container 116 may be associated with its "parent" collaboration group 115 in the collaboration groups table 427.

Based on the collaboration groups 115 associated with the containers 116 and the objects 430 by the corresponding ambassadors 157, the collaboration system 101 can determine which the users of the collaboration system 101 follow the identified collaboration groups 115 by accessing a follows table, in action 670. A follows table 429 may include entries that define which users 110 follow which collaboration groups and their associated activity feeds. The users 110 that are determined to follow specific collaboration groups 115 can then be verified as authorized users by querying the external application 105 that maintains the relevant object 430 in the event 427. If the external application 105 replies that the user 110 is authorized to access the object 430 in the event 427, then that user 110 will have access to the event 427. If the external application 105 replies that the user is not authorized or has limited authorization to access the object 430, then that user 110 will have no access or limited access to the event 427. The level of access can be analogous to the permission granted to the user 110 in the external application 105 for the particular object 430.

In action 690, the collaboration system 101 can generate user feed items 447 that associates authorized user 110 with the event 427. The user feed items 447 and collaboration group feeds items 437 can then be used by the collaboration system to populate corresponding user feeds and collaboration group feeds when the user 110 logs onto the collaboration system 101 and requests to access the various activity feeds 119. In some embodiment, only the events 427 associated with the user 110 in a corresponding user feed item 447 will be shown to the user 110 in the collaboration group feed that the user 110 follows. If the user 110 is not authorized to view the event 427 in his or her corresponding user feed, then that user 110 will not be allowed to view the event 427 based on his membership in a particular collaboration group.

Figure 7:
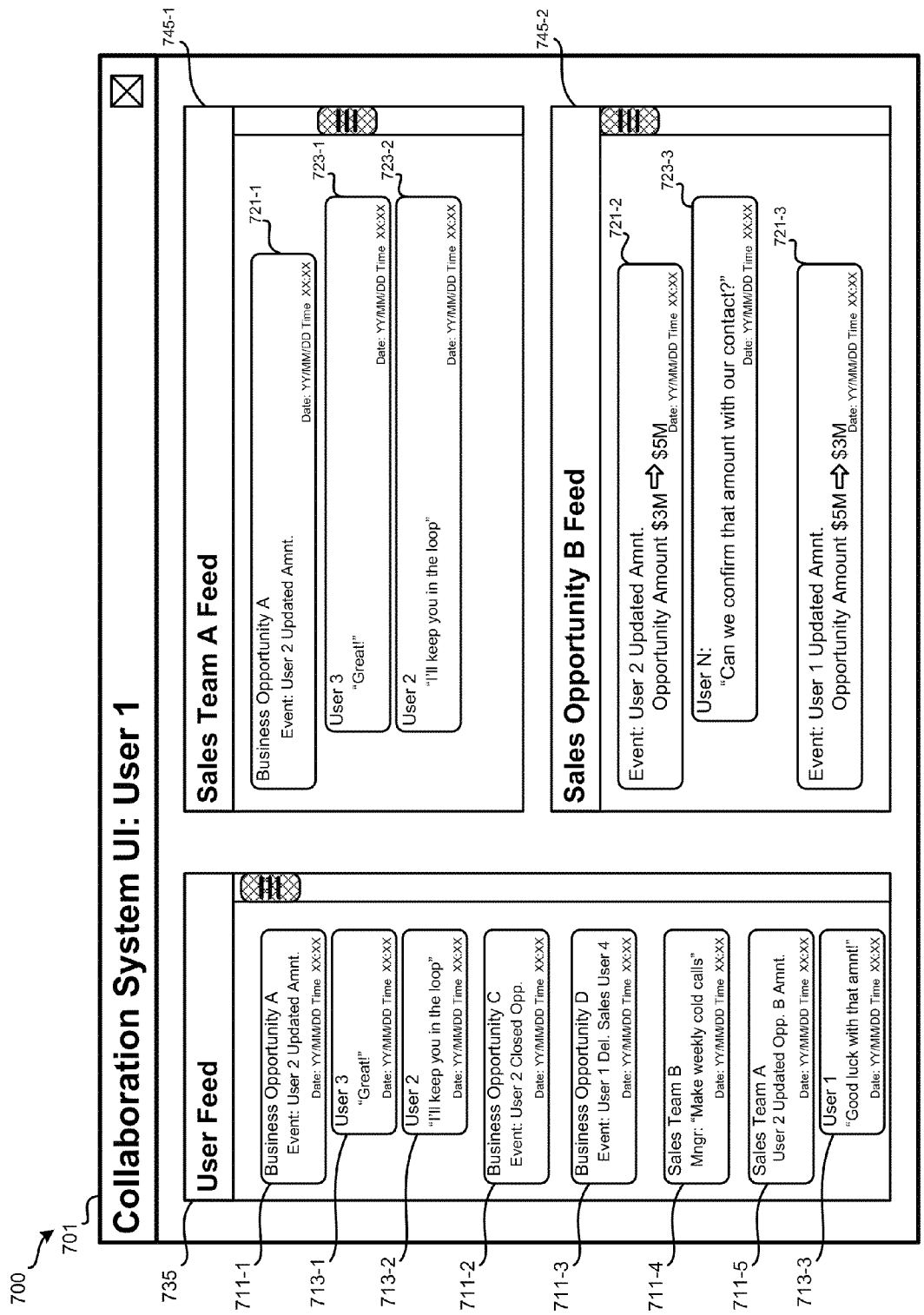
FIG. 7 depicts an example user interface for a collaboration system with collaboration group feeds and a user feed according to a particular embodiment of the present disclosure.

FIG. 7 illustrates an example collaboration system 101 user interface (UI) 700 for a particular user 110. As shown, the user interface 700 can include a collaboration window 701 that includes the user feed 735 associated with the particular user 110. The user feed 735 may include a number of user feed posts 711 and 713 rendered based on the user feed items 447 in the user feed tale 445 associated with the particular user 110. The user feed posts 711 includes the main topic events, while the user feed posts 713 are grouped relative to a topic event user feed posts 711.

The user interface 700 may also include a number of collaboration group feeds 745. In the particular example shown, the collaboration window 701 includes a window for a sales team A collaboration group feed 745-1 and a sales opportunity B collaboration group feed 745-2. Each collaboration group feed 745 may include a number of collaboration group feed posts 721 and 723 rendered from the collaboration group feed items 437 in the group feeds table 435. The collaboration group feed posts 721 and 723 are determined based on the routing tables 500. The user feed posts 711 and 713 are determined by the same routing tables 500 and the permissions granted to the particular user by the external application for the relevant objects.

Figure 8:
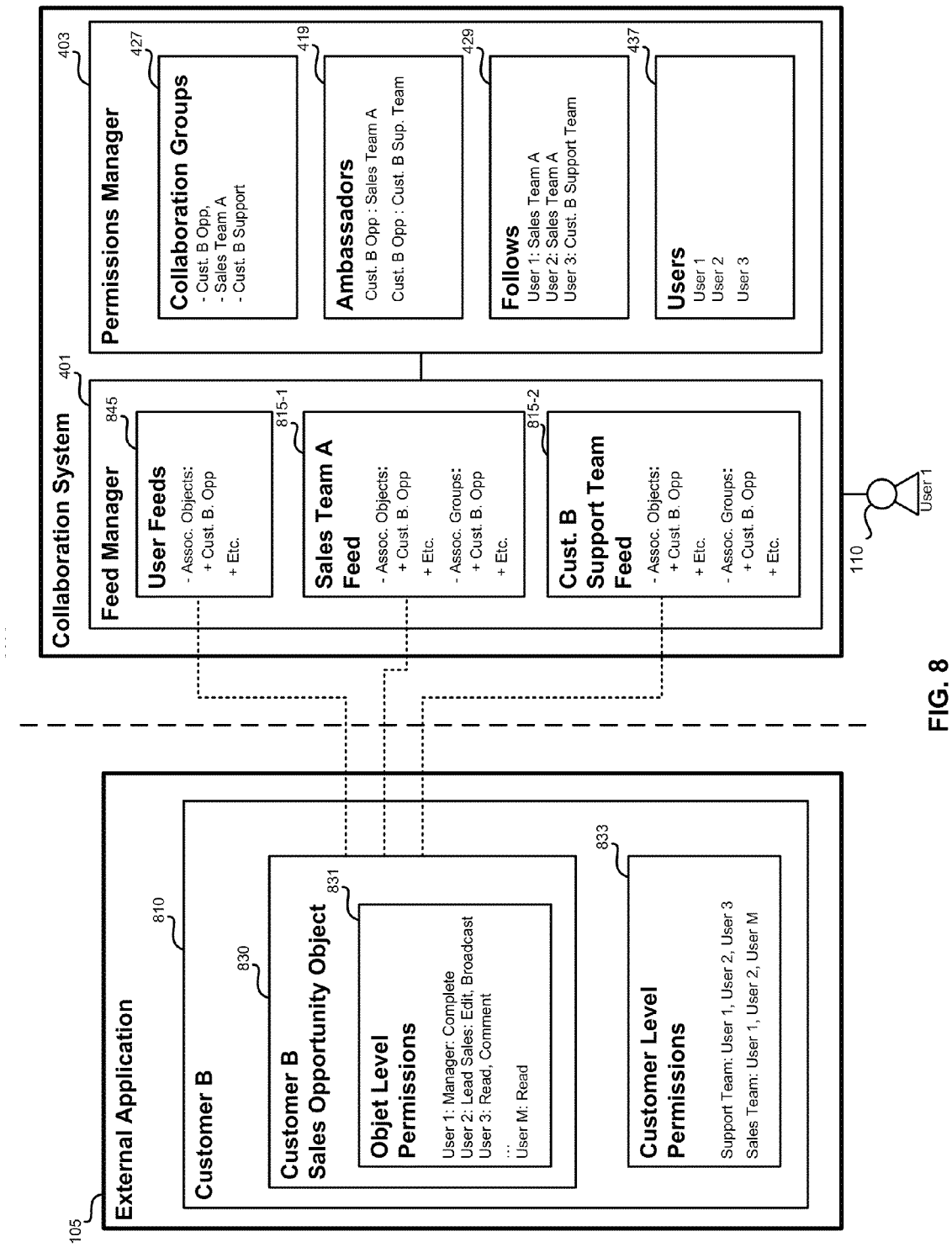
FIG. 8 illustrates a schematic of a particular configuration of permissions in an external application regarding a particular object and routing tables in a collaboration system according to an embodiment of the present disclosure.

FIG. 8 is an example of permissions granted to particular users 110 by an external application 105 and the relationship between the feed manager 401 and the permissions manager 403 relative to specific resulting user feeds 845 and the collaboration group feeds 815 based on the entries in the user feeds table 445 and collaboration group feeds table 435. FIG. 8 also shows one embodiment in which the permissions manager 403 handles and accesses the routing tables 500 including, but not limited to, collaboration groups table 427, ambassadors table 419, follows table 429, and users table 437, to provide the feed manger instructions as to which users 110 are authorized to which events based on authorization granted to particular users 110 to access relevant objects 430. In the case that an object 810 represents a customer, there can be other objects, such as a sales opportunity object 830 that are associated with or included in the customer object 810. In such embodiments, the authorization of a particular user may be based on object level permissions 831 or customer level permissions 833. FIG. 8 also illustrates that feed manger 401 may handle and render the user feeds 845 and collaboration group feed 815 based on the entries in the user feeds table 445 and collaboration group feeds table 435.

Figure 9:
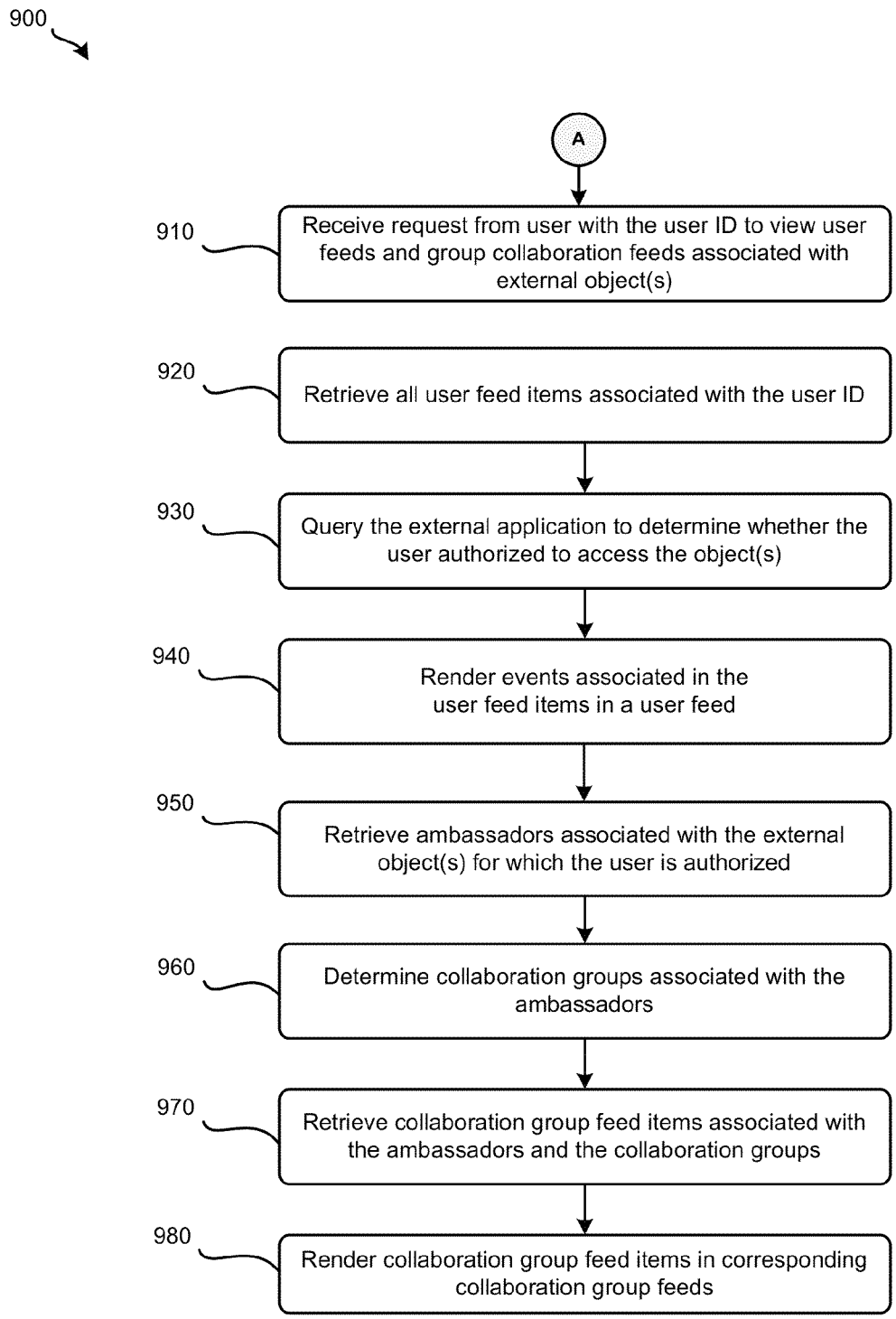
FIG. 9 is a flowchart of a method for routing group feed items to a requesting user, according to embodiments of the present disclosure.

FIG. 9 is a flowchart of a method 900 for granting a user 110 access to view particular collaboration group feed items 437, according to one embodiment of the present disclosure. The method 900 can begin at action 910 in which the collaboration system 101 can receive a request from a user 110 with a particular user ID to view user feed items and collaboration group feed items associated with various external objects 430. In some embodiments, the request from the user 110 can include a log in request to the collaboration system 101. In other embodiments, the request can include a request to refresh one or more activity feeds 119 when the user 110 is already logged onto the collaboration system.

In action 920, the collaboration system 101 can retrieve all user feed items 447 associated with the received user ID from a user feeds table 445.

In action 930, the collaboration system 101 can query the external application to determine whether the user 110 is authorized to access external objects 430 associated with the events 427 specified in the feed items 437 and 447. The collaboration system 101 can then render the events 427 associated with the user feed items 447 as posts in a user feed associated with the requesting user 110, in action 940. In some embodiments, only user feed items with events 437 associated with an object 430 that the user is authorized to access will be rendered in the user's personal user feed.

In action 950, the collaboration system 101 may retrieve ambassadors 157 associated with external objects 430 from the ambassadors table 419 for which the user is authorized to access. In action 960, the collaboration system 101 can determine collaboration groups 115 associated with the ambassadors 157 by referencing a collaboration groups table 427. The link between a particular collaboration group 115 and an ambassador may be made through an intermediary container 116.

In action 970, the collaboration system 101 can retrieve the collaboration group feed items 437 from the collaboration group feeds table 435 that are associated with the ambassadors 157 or relevant containers 116 and the parent collaboration groups 115. The collaboration system 101 can then render the collaboration group feed items 437 as posts in the corresponding collaboration group feeds for the user 110, in action 980.

Figure 10:
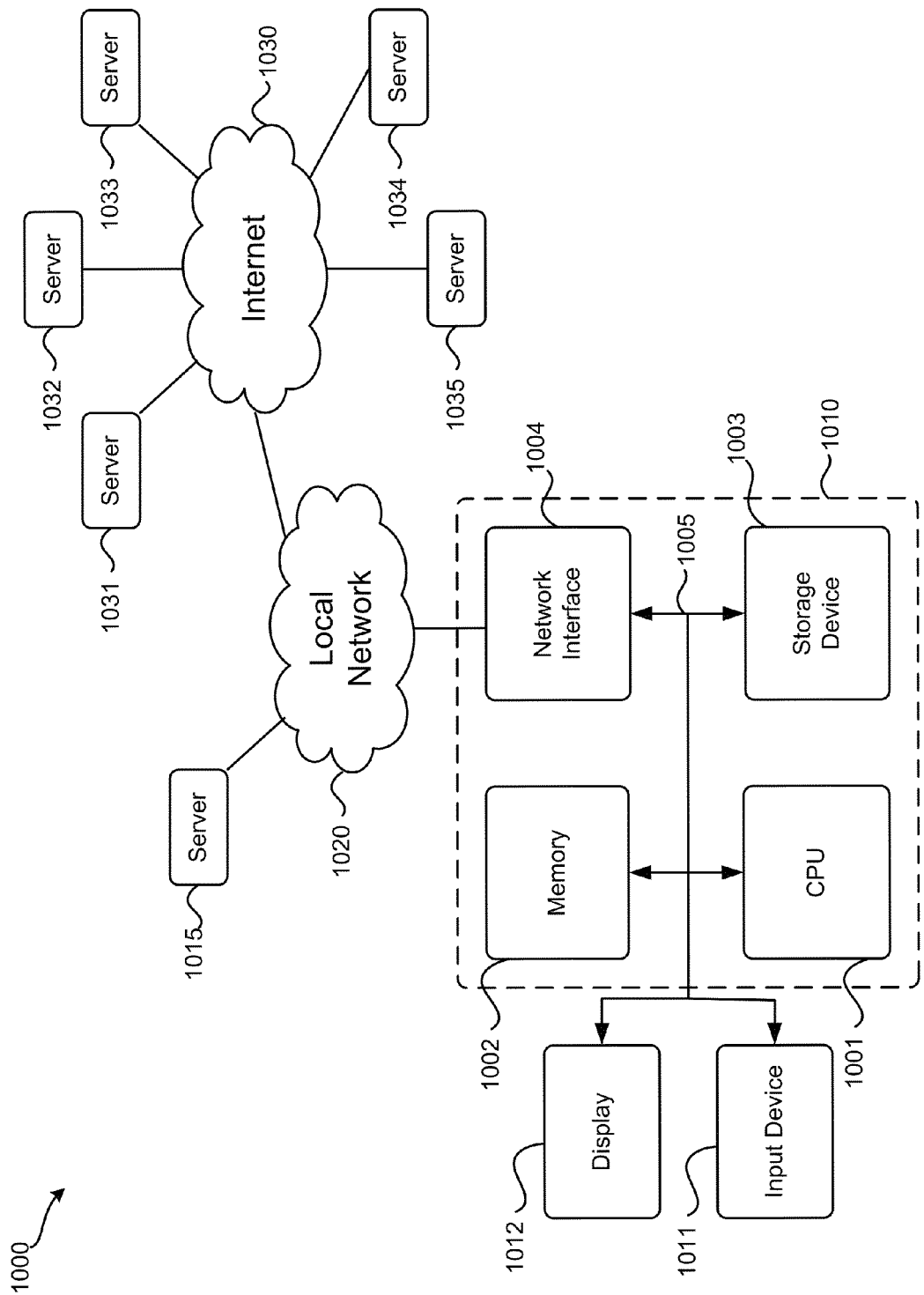
FIG. 10 illustrates a schematic of a general use computer and network that can be used implement various embodiments of the present disclosure.

FIG. 10 illustrates hardware of a special purpose computing machine configured according to the above disclosure. The following hardware description is merely one example. It is to be understood that a variety of computers topologies may be used to implement the above described techniques.

An example computer system 1010 is illustrated in FIG. 10. Computer system 1010 includes a bus 1005 or other communication mechanism for communicating information, and one or more processor(s) 1001 coupled with bus 1005 for processing information. One or more processor(s) 1001 may take various forms including microcontrollers and microprocessors such as programmable devices (e.g., CPLDs and FPGAs) and nonprogrammable devices such as gate array ASICs or general purpose microprocessors. Computer system 1010 also includes a memory 1002 coupled to bus 1005 for storing information and instructions to be executed by processor 1001, including information and instructions for performing some of the techniques described above, for example. This memory may also be used for storing programs executed by processor 1001. Memory 1002 may comprise a single or multiple storage components or devices. Possible implementations of this memory may be, but are not limited to, random access memory (RAM), read only memory (ROM), or both. A storage device 1003 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 1003 may include source code, binary code, or software files for performing the techniques above, for example. Storage device and memory may both include any suitable non-transitory computer-readable media such as those described herein. Memory 1002 and storage device 1003 may comprise a single or multiple memory or storage components or devices, respectively.

Computer system 1010 may be coupled via bus 1005 to an output device 1012 for providing information to a computer user. Output device 1012 may take the form of a display or speakers, for example. An input device 1011 such as a keyboard, touchscreen, mouse, and/or microphone, may be coupled to bus 1005 for communicating information and command selections from the user to processor 1001. The combination of these components allows the user to communicate with the system. In some systems, bus 1005 may represent multiple specialized buses, for example.

Computer system 1010 also includes a network interface 1004 coupled with bus 1005. Network interface 1004 may provide two-way data communication between computer system 1010 and a local network 1020. The network interface 1004 may be a wireless or wired connection, for example. Computer system 1010 may send and receive information through the network interface 1004 across a local area network, an Intranet, a cellular network, or the Internet, for example. One example implementation may include computing system 1010 acting as a central cache server that implements a cache safe mode solution to address instability at any cache server of a distribute cache server system as described above. In the Internet example, computing system 1010 may be accessed by the mobile devices through a wireless connection to the Internet, for example, and computing system 1010 may access data and features on backend systems that may reside on multiple different hardware servers 1031-1035 across the network. Servers 1031-1035 and server applications may also reside in a cloud computing environment, for example. Various embodiments may be practiced in a wide variety of network environments including, for example, TCP/IP-based networks, telecommunications networks, cellular communications networks, wireless networks, etc., or combinations of different network types.

As noted above, the apparatuses, methods, and techniques described below may be implemented as a computer program (software) executing on one or more computers. The computer program may further be stored on a tangible non-transitory computer readable medium, such as a memory or disk, for example. A computer readable medium may include instructions for performing the processes described herein. Examples of such computer readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM).

In addition, the computer program instructions with which various embodiments of this disclosure are implemented may be executed according to a variety of computing models including a client/server model, a peer-to-peer model, on a stand-alone computing device, or according to a distributed computing model in which various functions described herein may be performed at different locations.

The above description illustrates various embodiments of the present invention along with examples of how aspects of the present disclosure may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method for routing activity information in a collaboration system comprising operating one or more data processing units to perform the actions of:

receiving an activity notification regarding an activity involving an object from an external application separate from the collaboration system;

analyzing the activity notification to generate an event item comprising an object identifier associated with the object and a description of the activity involving the object;

accessing a first relationship table comprising a plurality of object-container association records to determine one or more container identifiers associated with the object identifier; and creating one or more group feed items in a group feeds table, wherein each group feed item comprises an event item identifier associated with the event item and one of the container identifiers;

rendering the plurality of group feed items as posts in a plurality of corresponding group feeds according to the container identifier;

receiving a comment through one of the plurality of corresponding group feeds from a user of the collaboration system;

generating a comment event item comprising a comment event identifier; and creating a group feed comment item in the group feeds table that includes the comment, the comment event item identifier, and the container identifier.

2. The method of claim 1 further comprising:
accessing a collaboration groups table comprising a plurality of container-group association records to determine one or more collaboration group identifiers associated with the one or more container identifiers;
accessing a second relationship table comprising a plurality of user-group association records to determine a set of user identifiers associated with the one or more collaboration group identifiers;
querying the external application to determine which of the set of user identifiers are authorized to access the object;
receiving a response from the external application comprising a set of authorized user identifiers; and
generating an intersection of the set of user identifiers and the set of authorized user identifiers to generate a set of common user identifiers.

3. The method of claim 2 further comprising:
creating a plurality of user feed items in a user feeds table, wherein each of the plurality of user feed items comprises one user identifier from the set of common user identifiers associated with the event item identifier; and
rendering the plurality of user feed items in a plurality of corresponding user feeds associated with individual users according to the set of common user identifiers.

4. The method of claim 1 further comprising:
accessing a collaboration groups table comprising a plurality of container-group association records to determine a collaboration group identifier associated with the container identifier;
accessing a second relationship table comprising a plurality of user-group association records to determine a set of user identifiers associated with the one or more collaboration group identifiers;
querying the external application to determine which of the set of user identifiers are authorized to access the object;
receiving a response from the external application comprising a set of authorized user identifiers; and
generating an intersection of the set of user identifiers and the set of authorized user identifiers to generate a set of common user identifiers.

5. The method of claim 4 further comprising rendering the group feed comment item as a comment post in collaboration group feeds associated with user identifiers in the set of common user identifiers.

6. The method of claim 1 wherein the object comprises a business object that represents a business record.

7. A non-transitory computer readable medium comprising instructions, which when executed by a computer processor cause the computer processor to be configured for routing activity information in a collaboration system by performing operations comprising:
receiving an activity notification regarding an activity involving an object from an external application separate from the collaboration system;
analyzing the activity notification to generate an event item comprising an object identifier associated with the object and a description of the activity involving the object;
accessing a first relationship table comprising a plurality of object-container association records to determine one or more container identifiers associated with the object identifier; and
creating one or more group feed items in a group feeds table, wherein each group feed item comprises an event item identifier associated with the event item and one of the one or more container identifiers;
rendering the plurality of group feed items as posts in a plurality of corresponding group feeds according to the container identifier;
receiving a comment through one of the plurality of corresponding group feeds from a user of the collaboration system;
generating a comment event item comprising a comment event identifier; and
creating a group feed comment item in the group feeds table that includes the comment, the comment event item identifier, and the container identifier.

8. The non-transitory computer readable medium of claim 7 wherein the instructions further cause the computer processor to be configured for:
accessing a collaboration groups table comprising a plurality of container-group association records to determine one or more collaboration group identifiers associated with the one or more container identifiers;
accessing a second relationship table comprising a plurality of user-group association records to determine a set of user identifiers associated with the one or more collaboration group identifiers;
querying the external application to determine which of the set of user identifiers are authorized to access the object;
receiving a response from the external application comprising a set of authorized user identifiers; and
generating an intersection of the set of user identifiers and the set of authorized user identifiers to generate a set of common user identifiers.

9. The non-transitory computer readable medium of claim 8 wherein the instructions further cause the computer processor to be configured for:
creating a plurality of user feed items in a user feeds table, wherein each of the plurality of user feed items comprises one user identifier from the set of common user identifiers associated with the event item identifier; and
rendering the plurality of user feed items in a plurality of corresponding user feeds associated with individual users according to the set of common user identifiers.

10. The non-transitory computer readable medium of claim 7 wherein the instructions further cause the computer processor to be configured for:
accessing a collaboration groups table comprising a plurality of container-group association records to determine a collaboration group identifier associated with the container identifier;
accessing a second relationship table comprising a plurality of user-group association records to determine a set of user identifiers associated with the one or more collaboration group identifiers;
querying the external application to determine which of the set of user identifiers are authorized to access the object;
receiving a response from the external application comprising a set of authorized user identifiers; and
generating an intersection of the set of user identifiers and the set of authorized user identifiers to generate a set of common user identifiers.

11. The non-transitory computer readable medium of claim 10 wherein the instructions further cause the computer processor to be configured for rendering the group feed comment item as a comment post in collaboration group feeds associated with user identifiers in the set of common user identifiers.

12. The non-transitory computer readable medium of claim 7 wherein the object comprises a business object that represents a business record.

13. A collaboration system comprising:
a processor; and
a non-transitory computer readable medium comprising instructions, which when executed by the processor cause the processor to be configured to:
receive an activity notification regarding an activity involving an object from an external application separate from the collaboration system;
analyze the activity notification to generate an event item comprising an object identifier associated with the object and a description of the activity involving the object;
access a first relationship table comprising a plurality of object-container association records to determine one or more container identifiers associated with the object identifier; and
create one or more group feed items in a group feeds table, wherein each group feed item comprises an event item identifier associated with the event item and one of the one or more container identifiers;
render the plurality of group feed items as posts in a plurality of corresponding group feeds according to the container identifier;
receive a comment through one of the plurality of corresponding group feeds from a user of the collaboration system;
generate a comment event item comprising a comment event identifier; and
create a group feed comment item in the group feeds table that includes the comment, the comment event item identifier, and the container identifier.

14. The collaboration system of claim 13 wherein the instructions further cause the processor to be configured to:
access a collaboration groups table comprising a plurality of container-group association records to determine one or more collaboration group identifiers associated with the one or more container identifiers;
access a second relationship table comprising a plurality of user-group association records to determine a set of user identifiers associated with the one or more collaboration group identifiers;
query the external application to determine which of the set of user identifiers are authorized to access the object;
receive a response from the external application comprising a set of authorized user identifiers; and
generate an intersection of the set of user identifiers and the set of authorized user identifiers to generate a set of common user identifiers.

15. The collaboration system of claim 14 wherein the instructions further cause the processor to be configured for:
create a plurality of user feed items in a user feeds table, wherein each of the plurality of user feed items comprises one user identifier from the set of common user identifiers associated with the event item identifier; and
render the plurality of user feed items in a plurality of corresponding user feeds associated with individual users according to the set of common user identifiers.

16. The collaboration system of claim 13 wherein the instructions further cause the processor to be configured for:
access a collaboration groups table comprising a plurality of container-group association records to determine a collaboration group identifier associated with the container identifier;
access a second relationship table comprising a plurality of user-group association records to determine a set of user identifiers associated with the one or more collaboration group identifiers;
query the external application to determine which of the set of user identifiers are authorized to access the object;
receive a response from the external application comprising a set of authorized user identifiers; and
generate an intersection of the set of user identifiers and the set of authorized user identifiers to generate a set of common user identifiers.

17. The collaboration system of claim 16 wherein the instructions further cause the processor to be configured for rendering the group feed comment item as a comment post in collaboration group feeds associated with user identifiers in the set of common user identifiers.

18. The collaboration system of claim 13 wherein the object comprises a business object that represents a business record.

* * * * *